US012411854B2

United States Patent
Daga et al.

(10) Patent No.: US 12,411,854 B2
(45) Date of Patent: Sep. 9, 2025

(54) INTEGRATING MACHINE LEARNING MODELS IN MULTIDIMENSIONAL APPLICATIONS

(71) Applicant: ORACLE INTERNATIONAL CORPORATION, Redwood Shores, CA (US)

(72) Inventors: Manish Daga, Bangalore (IN); Sudhakara Reddy, Bangalore (IN); Munish Kaushik, Bengaluru (IN); Suresh Babu Thavarool Puthiyadath, Camas, WA (US); Anju Christudas, Bhilwara (IN); Anagha A. Kadoo, Nagpur (IN)

(73) Assignee: Oracle International Corporation, Redwood Shores, CA (US)

( * ) Notice: Subject to any disclaimer, the term of this patent is extended or adjusted under 35 U.S.C. 154(b) by 870 days.

(21) Appl. No.: 17/679,300

(22) Filed: Feb. 24, 2022

(65) Prior Publication Data

US 2023/0267366 A1     Aug. 24, 2023

(51) Int. Cl.
*G06N 3/10*     (2006.01)
*G06F 16/2457*     (2019.01)
(Continued)

(52) U.S. Cl.
CPC ......... *G06F 16/24573* (2019.01); *G06N 3/10* (2013.01); *G06N 20/00* (2019.01);
(Continued)

(58) Field of Classification Search
CPC ........... G06F 16/2443; G06F 16/24573; G06F 17/18; G06N 20/10; G06N 20/00
See application file for complete search history.

(56) References Cited

U.S. PATENT DOCUMENTS

| 11,726,994 B1 * | 8/2023 | Wang | G06F 16/24573 |
| | | | 707/769 |
| 2016/0292162 A1 * | 10/2016 | Guirguis | G06N 20/10 |

(Continued)

OTHER PUBLICATIONS

Data Mining Group; PMML 4.1—General Structure; pp. 1-11, downloaded on Jan. 19, 2022 from: http://dmg.org/pmml/v4-1/GeneralStructure.html.

(Continued)

*Primary Examiner* — Tuan A Vu
(74) *Attorney, Agent, or Firm* — Kraguljac Law Group LLC (57) ABSTRACT

Systems, methods, and other embodiments associated with integrating a machine learning model into a target application are described. In one embodiment, a method includes parsing a definition file that represents the selected ML model to (1) identify one or more input features defined for the ML model, and (2) identify one or more output predictions that the ML model is configured to generate. The input features and output predictions are mapped to locations within the target application. An executable script is generated and configured to function as a data controller or a data communication interface to obtain the input values from the target application and pass data between the target application and the ML model. In response to obtaining the output predictions, the output predictions are inserted in one or more result locations within the target application.

20 Claims, 5 Drawing Sheets

(51) Int. Cl.
  *G06N 20/00* (2019.01)
  *G06N 20/10* (2019.01)
  *G06F 16/242* (2019.01)
  *G06F 17/18* (2006.01)

(52) U.S. Cl.
  CPC ......... *G06N 20/10* (2019.01); *G06F 16/2443* (2019.01); *G06F 17/18* (2013.01)

(56) References Cited

U.S. PATENT DOCUMENTS

2018/0373988 A1\* 12/2018 Dhanyamraju ......... G06F 17/18
2021/0357785 A1  11/2021 Mukherjee et al.
2022/0309286 A1\* 9/2022 Freese ................ G06F 16/2443

OTHER PUBLICATIONS

Microsoft Docs; Import Machine Learning Models as Concepts; article dated Oct. 7, 2021; pp. 1-4; downloaded from: https://docs.microsoft.com/en-us/bonsai/guides/import-ml-models?tabs-onnx%2Cnested1.
Wikipedia; Predictive Model Markup Language; pp. 1-6; (last edited Dec. 4, 2021); downloaded from: https://en.wikipedia.org/w/index.php?title=Predictive_Model_Markup_Language&oldid=1058617046.

\* cited by examiner

410
YEAR 2022

| | JAN | | | ... ...... | DEC | | |
|---|---|---|---|---|---|---|---|
| Product | Industry Vol. | Price | Volume | | Industry Vol. | Price | Volume |
| Regular Cola | xxx | xxx | xxx | | xxx | xxx | xxx |
| Diet Cola | xxx | xxx | xxx | | xxx | xxx | xxx |
| Orange | xxx | xxx | xxx | | xxx | xxx | xxx |
| Apple | xxx | xxx | xxx | | xxx | xxx | xxx |
| ... | | | | | | | |

Input Data Locations 420    Target Result Locations 425    Input Data Locations 420    Target Result Locations 425

INTEGRATING MACHINE LEARNING MODELS IN MULTIDIMENSIONAL APPLICATIONS

COPYRIGHT NOTICE

A portion of the disclosure of this patent document contains material subject to copyright protection. The copyright owner has no objection to the facsimile reproduction of the patent document or the patent disclosure as it appears in the U.S. Patent and Trademark Office patent file or records, but otherwise reserves all copyright rights whatsoever.

BACKGROUND

Machine learning (ML) models may be built using various platforms such as Python, R, SAS, etc. ML models may also be built using various algorithms such as regression algorithms, instance-based algorithms, decision tree algorithms and/or other suitable algorithms and models. Due to their complexity, ML models are built and trained by skilled data scientists.

To build an ML model that makes predictions and/or forecasts future outcomes, the ML model is trained using data mining of prior historical data and complex probability algorithms to predict outcomes. The ML model must then be implemented with some application that uses the ML model. Typically, the ML model is built in a computing system/platform that is external to the computing system/platform of the application that will use the ML model. This further adds to the complexity of using ML models by users of the application. In general, users of the application are not technical computer scientists and do not have the technical knowledge of ML models.

Integration or implementation of an ML model into an application that uses the ML model requires a custom configuration (e.g., custom coding) based on the type of ML model being deployed and the configuration of the application. Each time a new ML model with a different input or a different output is deployed, the new ML model again requires additional custom coding to configure and connect the ML model with the application.

The custom configuration to implement the ML model requires the skill of a data scientist with technical knowledge of both the ML model and the application. Thus, a non-technical user of the application cannot implement an ML model without the assistance from the data scientist. Furthermore, the custom coding typically leads to a relatively long and costly deployment cycle from development to production.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

The present disclosure describes an integration system and method that integrates machine learning (ML) models into a target multidimensional application. In one embodiment, the present integration system allows a non-technical user to import an externally created ML model directly into a computing platform and integrate the ML model with a target application without custom coding. The user may then consume/use the ML model directly in the target application seamlessly.

In one embodiment, the computing platform may be an enterprise performance management (EPM) platform that is configured with the present integration system including a user interface(s) that allows for the integration of one or more available ML models into a target multidimensional planning application. The present integration system and method may be applied to any type of computing platform or target application.

The present integration technique is an improved integration process based on properties of a selected ML model to automatically map input features and output predictions of the ML model to appropriate dimensions or intersections in a target application. The present system allows a non-technical user to easily import and integrate ML models into a target application without knowing technical details of the ML model. Once integrated and mapped to the target application, the ML model may be used to generate predictions for the target application.

Definitions

The following terms and definitions are used in this disclosure.

"ML model" and "model" as used herein refer to a Machine Learning model and/or a predictive analytic model. These models refer to mathematical models that use statistical techniques or ML algorithms to learn patterns hidden in large volumes of historical data. Predictive analytic ML models use the knowledge acquired during a training phase to predict the existence of known patterns in a set of new data. Based on how the ML model is configured and trained, the ML model generates and outputs one or more predictions based on one or more defined input features.

"PMML" (Predictive Model Markup Language) is a computer language used to represent an ML model/predictive model. A PMML file, for example, is a model file formation that is XML-based, which defines properties of and represents an associated machine learning (ML) model. The PMML file may contain data transformations (pre- and post-processing), data manipulations, a predictive workflow as well as one or more predictive models.

PMML allows a computing system to share predictive analytic models between different applications without having to generate custom code to re-create the ML model. Therefore, you can train an ML model in one computing system or platform, express the ML model in a PMML file, and move the PMML file to a different target system. The target system can easily recognize and understand the predictive solution of the ML model from the PMML file. Thus, the target system may then use the ML model (based on its PMML file) to predict whatever values or conditions the model was trained for (e.g., predicting a likelihood of machine failure based on a set of data).

"ONNX" (Open Neural Network Exchange) is another language and model file format for representing an ML model. An ONNX file may be used in a similar manner as a PMML file for representing and moving an ML model.

Discussion of various embodiments of the present integration system will be described with reference to the figures.

Figure 1:
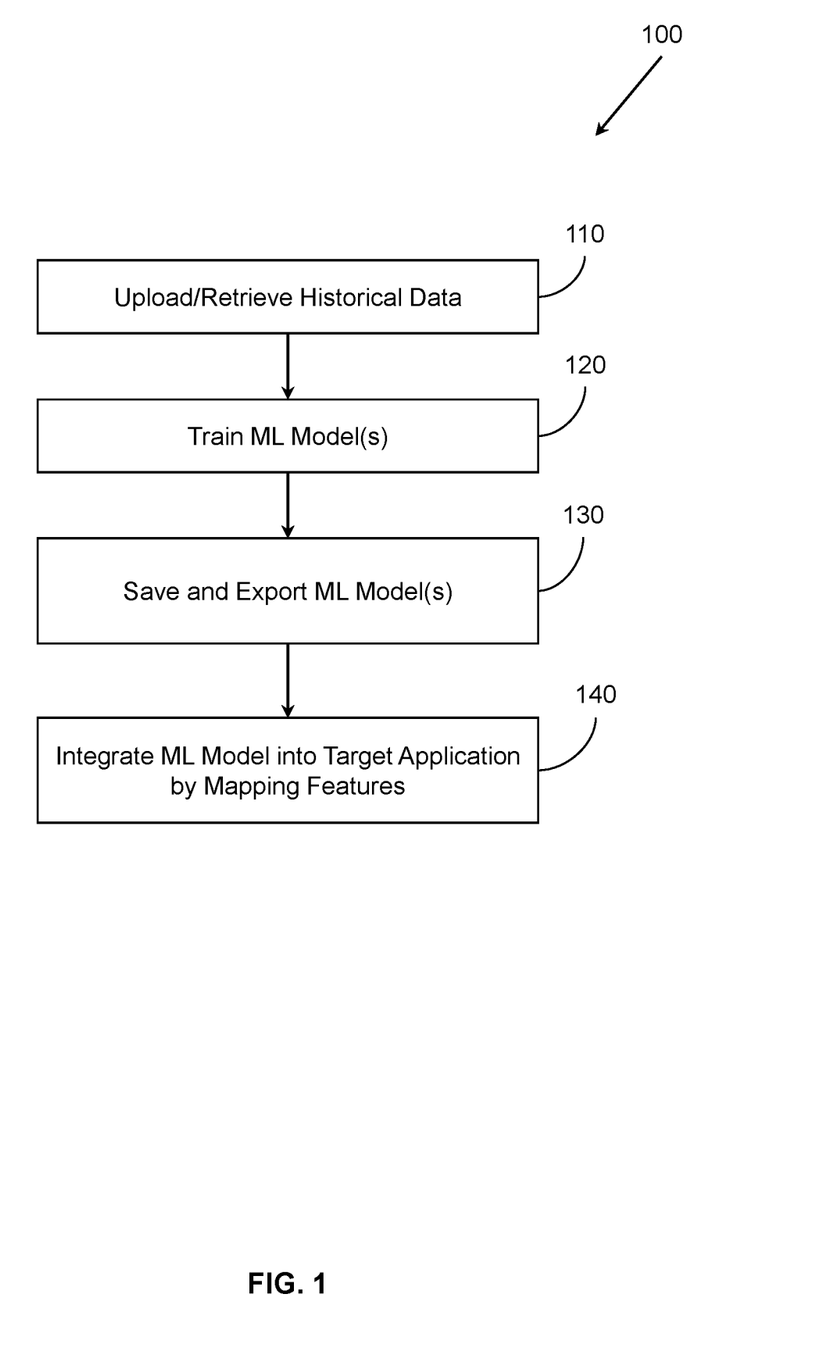
FIG. 1 illustrates one embodiment of a method associated with training a machine learning model and integrating the model into a target application.
Figure 2:
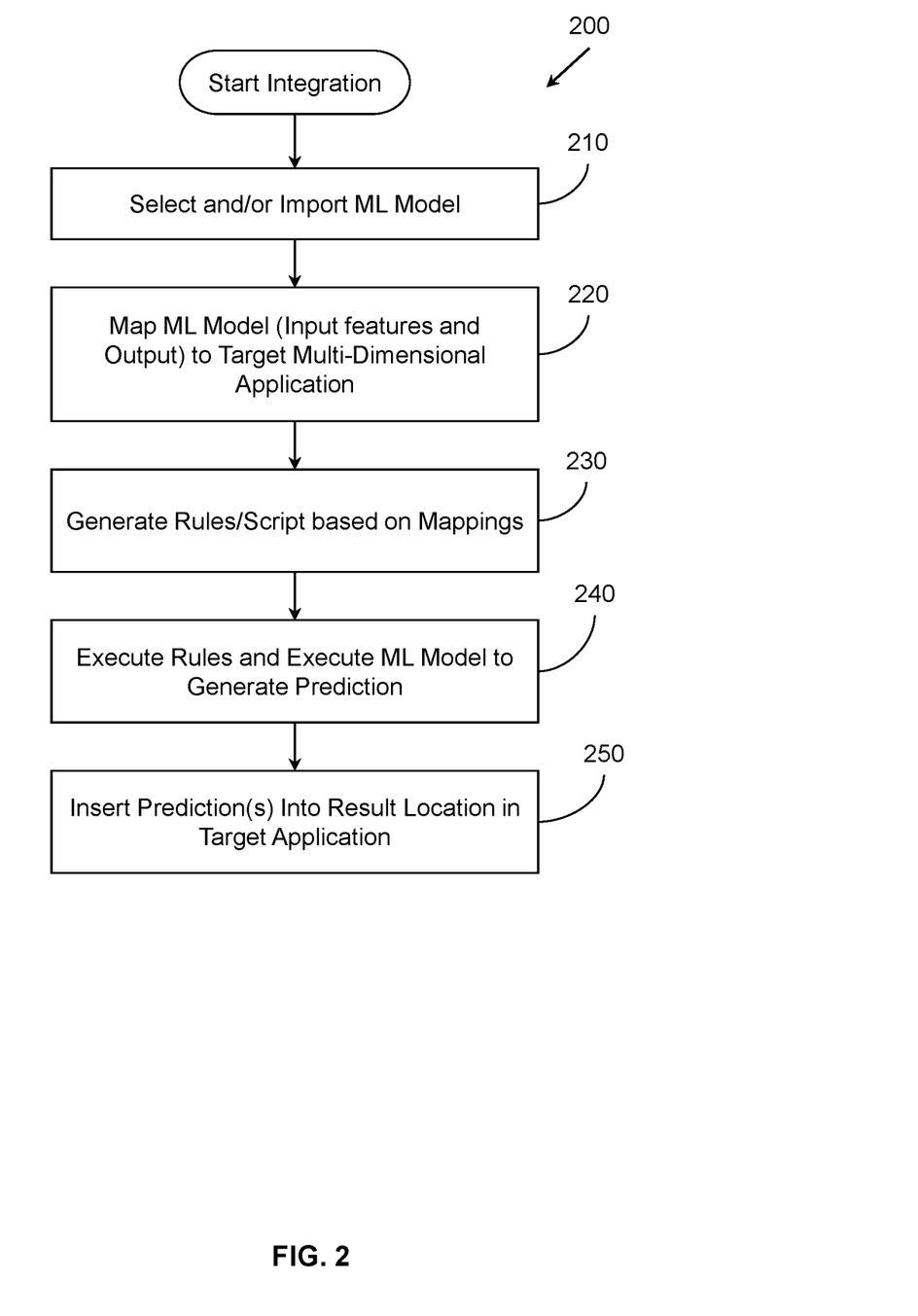
FIG. 2 illustrates one embodiment of a method associated with integrating/importing an ML model into a target application using mapping.

With reference to FIG. 1, in one embodiment, the present integration system may be regarded as having two phases or parts. Namely, a model creation phase 100 as shown in FIG. 1 and a model integration/consumption phase 200 as shown in FIG. 2.

During the model creation phase 100, a machine learning (ML) model is created in a ML platform and trained for a particular purpose. For example, the ML model is trained to make predictions and/or forecasts based on a set of training data. The ML model may be trained to predict some outcome such as a likelihood that a computer component will fail under certain conditions, predict if an email is authentic, predict future weather conditions, predict future sales of a product, predict staffing requirements of a company, or any other type of prediction.

At block 110, historical data associated with the desired purpose of the ML model is uploaded to an ML platform or retrieved from a database(s). At block 120, the historical data is used to create (train) an ML model. In one embodiment, one or more ML models may be trained in different platforms (e.g., R, Python, SAS, etc.) and/or different types of ML models can use different machine learning algorithms (e.g., regression algorithms, instance-based algorithms, decision tree algorithms, etc.).

The different models may be tested for how accurate their predictions are based the historical data and the desired purpose. The best performing ML model may then be selected as the final ML model. Details of training and testing an ML model is beyond the scope of this disclosure and will be understood by those of ordinary skill in the art.

At block 130, the final ML model is saved and exported in a model file formation (referred to herein as "a definition file") that represents the ML model. For example, as previously described, the definition file may be a PMML file (saved as an XML file) or ONNX file. In other embodiments, the definition file may be created with other model file formations, for example but not limited to, a scikit-learn model (saved in a pickle file); a Spark MLlib model (saved using the save method of the model object); a TensorFlow model (saved in a .pb file); a Keras model (saved in a .h5 file), etc.

Once created, the definition file may then be transmitted and/or uploaded to different computing systems where the ML model is desired to be used. In another embodiment, whenever new historical data is available for the ML model, the ML model may be retrained and exported as an updated model (e.g., new definition file) that replaces the old ML model. The old ML model may then either be archived or discarded.

At block 140, after the trained ML model (definition file) is transmitted to or otherwise imported into a target system, the trained ML model may be integrated into a target application. In one embodiment, integration is performed by mapping ML model input features and ML model output (the prediction results) to appropriate intersections (e.g., appropriate slices of data) from the target application. The mappings create connections and/or associations so that data involved in the mappings can flow seamlessly between the target application and the ML model. In one embodiment, the target application is a multidimensional planning application. Additional details of the integration are described with reference to FIG. 2.

With reference to FIG. 2, one embodiment of an integration method 200 is illustrated for integrating/importing an ML model into a target application. The integration method 200 is a computer-implemented process performed by a computing system that executes executable code configured to perform the method 200. The computing system and integration method 200 are configured with graphical user interface screens that control the steps of integration process and provides selectable options, input fields, and output fields.

In one embodiment, to initiate the integration method 200, a target application is selected and/or a menu option may be provided within the target application to import an ML model into the target application.

At block 210, a user interface screen is generated and displayed on a display device that provides a list of ML models that are available for selection. The list may include names of each ML model and a description of what the ML model is trained to predict. For example, a model name may be "VolumeForecastingML" and its description may be "ML model for volume forcasting based on price, promotion, etc." This allows a user to easily identify and select the type of ML model for integration into the target application.

In response to an ML model being selected from the list of available ML models, the computing system identifies and retrieves a definition file that represents the selected ML model. Based on the format of the definition file such as PMML file, ONNX file, or other type of model format file, the system is configured to identify input features required by the ML model and the output prediction of the ML model from the syntax of the file format. For example, each file format has a defined syntax (e.g., specified words, statements, expressions, and structure) for representing input features and output features of the ML model.

For example, a PMML file may have a statement as follows, which is defines the output of the ML model:
    <OutputField name="Predicted_Volume" optype="continuous" datatype="double" feature="predictedValue"/>. Thus, searching for "outputfield" will identify one of the output features of the ML model.

Based on the file format, the definition file is parsed by the system to (1) identify one or more input features defined for the ML model, and (2) identify one or more output predictions that the ML model is configured to generate.

At block 220, the system provides a mapping mechanism to map the one or more input features of the ML model to one or more input data locations from the target application. The mapping mechanism also provides for the mapping of the one or more output predictions of the ML model to one or more result locations within the target application and/or in a data storage location associated with the target application. In general, the mapping mechanism provides functions to clearly define the data source(s) of input features for the imported ML model (PMML file) and define a target (result location) where "predicted output" generated by the ML model will be stored or consumed by users as part of the target application.

Figure 3:
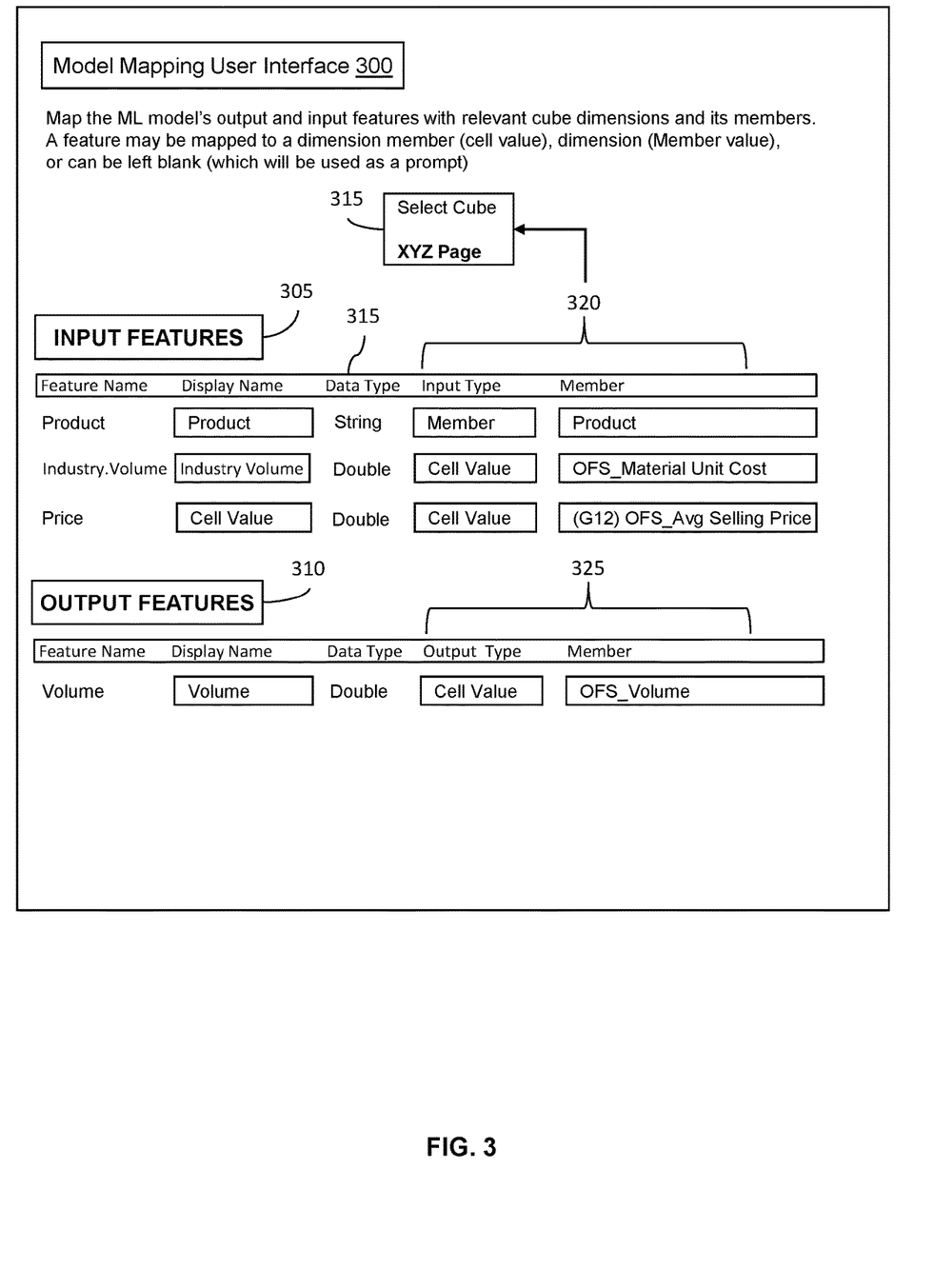
FIG. 3 illustrates one embodiment of a model mapping user interface for mapping input features and output features between an ML model and a target application.

In one embodiment, the mapping mechanism includes a model mapping user interface. Once the system identifies the input and output features of the ML model from the definition file, the model mapping user interface (UI) is generated based on the ML features and is displayed. FIG. 3 shows one embodiment of a model mapping UI 300 to create and configure mappings between the ML model features and appropriate dimensions/intersections/values from the target application.

The dimensions/intersections/values in the target application correspond to the one more input data locations (source locations) from which the ML model will receive input values for the input features of the ML model. The input values will be used by the ML model to generate a prediction.

With reference to FIG. 3, the model mapping UI 300 displays the Input Features 305 and Output Features 310 that were identified from the ML model. All the "Input features" 305 from the ML model need an input in order to generate a prediction based on the input. An input menu bar 315 shows various information about the input features identified from the ML model (e.g., feature name and data type). Each input feature may include selectable/modifiable parameters involved in the mapping such as "Display Name" of the input feature and one or more input data location fields 320 to identify the source location(s) of data from the target application that will be used as input data to the corresponding input feature.

In FIG. 3, example Input Features are shown in a column Feature Names that include three inputs: "Product," "Industry.Volume" and "Price" that may be part of an ML model that predicts sales volumes for a product. Of course, any number of input features may be used by an ML model. Another column identifies a "Data Type" of each input feature. This information is identified from the PMML definition file of the ML model. Data type may be any type of data such as string, numeric, double precision, etc.

The one or more input data location fields 320 define the mapping between the ML model input features and source data locations from the target application. In other words, the source data locations identify the input data that will be used by each input feature of the ML model. The type and quantify of input data location fields 320 is generally based on how the data in the target application is organized and structured. Thus, different types of location identifiers may be used to clearly define the source location(s) of data for each input feature.

In one embodiment, the target application may include data organized as spreadsheets (or forms with data) and may have multiple pages of data. Each page of the spreadsheets may have a unique name identifying the page and thus the corresponding data on that page. In one embodiment, the model mapping UI 300 contains an option to select a particular page of data, which is referred to as a cube ("Select Cube Option) as part of the input data locations 320.

The selected page is a data source location and constitutes one portion of the mapping that identifies the location of input data that will be used by the ML model. In another embodiment, additional fields may be provided to identify the scope of the ML model within the selected cube based on specified types of data within the selected cube, e.g., account, period, years, etc.

Furthermore, as part of the selected spreadsheet page/cube, the input data locations 320 may include fields for identified locations and/or types of data within that selected spreadsheet page/cube. This may include "Input type" and "Member."

In general, a user using the model mapping UI 300 is assumed to have knowledge of the target application. Thus, the user can map each input feature to the appropriate input data parts from the selected cube/page or other portions of the target application.

In one embodiment, the "Input Type" field is used to define the type of data being mapped to the input feature. The input type may be a single data value (which would correspond to a single location such as a spreadsheet cell value) or a group of data that belongs to a selected category (which would correspond to multiple data locations/cells).

For example, when the target application includes a spreadsheet of data (rows and columns of cells that define multiple dimensions), the input data location may be a cell value in a selected page/cube in the spreadsheet (e.g., a dimension member) or a dimension itself (member value), which would include all data values that are associated with that dimension. For example, Input Type="Cell Value" identifies a specific cell in the cube data structure such as "OFS_Material Unit cost" (e.g., the name of the cell) or by a column/row cell location (e.g., G12).

In the "Member" column, a "product" value may be a dimension such that defines a category of data that is used for input purposes to the ML model. Thus, data for all "products" contained in the identified dimension are used as input to the ML model. For example, "product" may refer to all products that have data in a database or may identify a particular sub-category, which may be a different dimension in the data, like "soft drinks." The soft drinks dimension may further include sub-categories like cola, diet cola, fruit punch, water, etc. In one embodiment, the Input Type may be left blank, which will cause the value to be used as a prompt to receive an input value.

In general, the model mapping UI 300 is configured based on the data organization and data structure of the target application to define the data source for each Input Feature of the ML model. Thus, the possible input data source locations that can be selected are changed based on how the data is organized. For example, if the data is organized in spreadsheets, particular types of source locations identifiers may be used that are associated with spreadsheets. If the source data is contained in a database or file, then locations are configured to identify source locations for retrieving the corresponding data values from the database or file, for example, by query requests or other file access functions.

With further reference to FIG. 3, in the "Output Features" Section 310, this shows what the ML model outputs as a prediction based on the input features. In FIG. 3, the example output feature has the Feature Name "Volume" and has a Data Type of "Double" precision numeric. The output feature is then mapped to a result location 325 as part of the target application. The result location 325 is identified in a similar manner as the input data locations 320 in the Input Features Section 305, which is based on the type of data organization used by the target application.

In the example of FIG. 3, the result location is shown as "Output Type" and "Member" similar to the input type and member parameters in the Input Features Section 305 since the target application data is organized in spreadsheets.

Thus, once the ML model generates a result prediction, the result prediction will be automatically inserted into the mapped result location 325 based on the mappings. This is the target location where "predicted output" will be stored or consumed by users. The result location may be, for example, a one or more cell locations in a spreadsheet, a location(s) on a live display screen, a data record(s) in a database, or other type of location. It is noted that the predicted output may contain multiple predications such as predicting a product volume for each month over a future six month time period.

Figure 4:
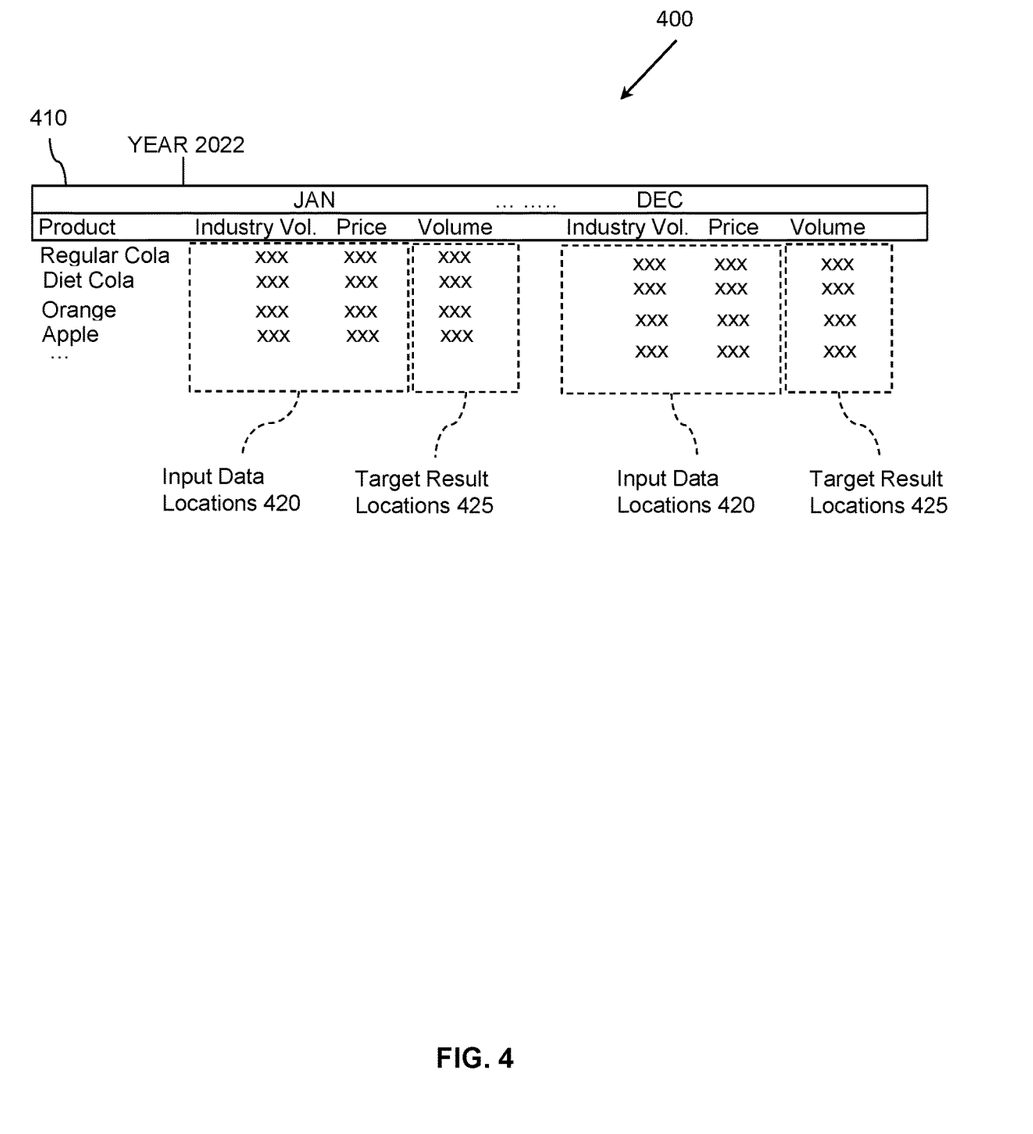
FIG. 4 illustrates an example of a visual representation of identifying input data locations and result locations from a data source.

With reference to FIG. 4, one embodiment of a spreadsheet 400 (e.g., a data source) is shown that may be associated with a target application. FIG. 4 is used to show an example of a visual representation of identifying input data locations 420 and result locations 425, which may be defined using the model mapping UI 300 from FIG. 3. It is noted that the mappings explained with reference to FIG. 3 do not correspond to the example in FIG. 4 because they are different mappings and different examples. In the example of FIG. 4, suppose the target application is a product planning application and the ML model being imported has been trained to predict and forecast product sales volumes based on inputs including industry volume and price.

The spreadsheet 400 shows data from multiple "Products" 410 in separate rows. Each product row has historical data for "Industry Volume" and "Price" data per month from JAN to DEC from one or more years. The data in these cells are identified as input data locations 420 for the ML model. The ML model will use data from these locations as input to the model to generate a volume prediction for each product for each month selected. The volume predictions generated by the ML model are selected to be for each month JAN to DEC in year 2022. The predictions from the ML model are mapped to target result locations 425, which correspond to cell locations corresponding to each product row that is part of the input data 420.

With reference again to FIG. 2 and the integration method 200, at block 230, after the mappings of input and output features are complete, an executable rule(s) or script is automatically generated based on the mappings between the ML model and target application. The mappings are defined and stored as part of the executable rules/script. In general, the rule/script is configured to function as a data controller and/or data communication interface to obtain data and pass data between the target application and the ML model. Once generated, the rule/script can be used to execute the ML model and run predictions for the target application. In one embodiment, the rules/script may be generated using a scripting language, object-oriented programming language, or other computer executable language to generate a sequence of statements for performing the functions of the rule/script.

In one embodiment, the generated rule/script may be embedded or otherwise linked to a form/spreadsheet in the target application. A selectable option may be provided in the target application to initiate and run the rule (and thus execute the ML model predictions) on-demand while the target application is executing and being worked on by a user. The generated rule/script may also be configured as a batch rule/script and executed as a batch process while the target application is not executing.

In one embodiment, the executable rule/script is configured to define the data mappings and execute the ML model based on the data mappings. Based on the defined data mappings, the rule/script is generated and configured with statements to at least retrieve input data values from the one or more input data locations from the target application and pass the data values to the ML model as the one or more input features.

The rule/script is further configured to obtain the one or more output predictions from the ML model and automatically insert the one or more output predictions into the one or more result locations within the target application. In this manner, the rule/script is configured to function as a data controller and data communication interface to obtain data and pass data between the target application and the ML model. The rule/script may include statements that use one or more application programming interfaces (APIs) for communicating with the ML model. The rule/script may also include statements that use one or more APIs that are available on the computing platform to perform the data retrieval and transmission via network components and databases that are part of the computing platform of the target application. In one embodiment, the rule/script is a groovy rule.

At block 240, in response to the rule/script being initiated on-demand or as a batch process, the rule/script is executed which in turn executes the ML model associated with the rule/script. Based on the defined mappings, data values associated with the mapped input data locations from the target application are retrieved and passed to the ML model as its input features. The ML model is executed and one or more output predictions are generated based on the input features. The rule/script then obtains the one or more output predictions from the ML model.

At block 250, the one or more output predictions obtained from the ML model are automatically inserted by the rule/script into the result location(s) of the target application as previously defined. This may include displaying the output predictions on a live spreadsheet/form a display screen when the rule/script is executed on-demand with the target application. When executed as a batch rule, the inserting may include automatically inserting and storing the output predictions into one or more data records in a database, or other type of data structure for retrieval and viewing at a subsequent time.

Accordingly, the present system/method provides a technical approach to seamlessly integrate ML models into a target application without requiring technical knowledge of how an ML model is configured or its required data inputs.

On-Demand and Batch Embodiments

In another embodiment of the integration method 200, as previously stated, the generated rule/script and ML model may be executed on-demand with the target application or as a batch process while the target application is not executing. Since the rules/script controls the execution of the ML model, the ML model is executed on-demand or as a batch process in accordance with the rules/script. In another embodiment, two separate rules/scripts may be generated and saved, one for on-demand predictions and one for batch predictions. The execution of the two rules/scripts may be provided as options and controlled by selection via a user interface or menu options.

The following is discussed with reference to the target application being a multi-dimensional planning application that when executed generates one or more data sheets (spreadsheets/forms) with rows and columns of data values. Each intersection of the rows and the columns identifies a cell location within a data sheet that contains a data value. The data values of generated on a live data sheet and displayed on a display device while a user is working with the target application. Conversely, when the target application is not currently executing, there are no live data sheets displayed on a screen. Rather, the data values are contained in a data structure (database).

To generate the rule/script as a batch rule, the system configures the executable rule/script to retrieve the input data values from the one or more input data locations by querying the database associated with the target application and retrieving the input data values corresponding to the one or more input data locations from the database. Since the target application is not currently executing, the rule/script cannot retrieve the input data values from a live spreadsheet. Thus, the input data is retrieved from a storage location (database) from where the data is maintained. Likewise, the output predictions from the ML model are automatically inserted and stored into the mapped locations in the database. In one embodiment, the input data locations may be identified and mapped via a run time prompt.

In one embodiment, the batch rule/script may be configured to accept RTP (Run Time Prompt) inputs for receiving input data (e.g., the dimensions used for input data) that is mapped to the input features of the ML model. Thus, in one embodiment, if a user input is expected during the execution of the ML model, the mapping UI is configured to prompt for user input to receive the input data. In such cases when the rule is executed, the rule is configured to prompt for user input (e.g., using Run Time Prompts). In other cases, the input features for the ML model and output from the ML model are automatically derived based on the mappings defined in the model mapping UI. RTP variable limits may be set to the member selection done on the UI.

To generate the rule/script for on-demand execution, the system configures the executable rule/script to retrieve the input data values from the one or more input data locations that are cell locations within the one or more data sheets (see FIG. 3 or 4, for example). The executable rule/script is also configured to transmit the input data values from the cell locations to the one or more input features of the ML model.

In one embodiment, the on-demand rule/script may be attached to a form/spreadsheet of the target application and executed through a custom menu or from a rules menu. The rule will run prediction on the members from the form/spreadsheet context. A 'Prompt' input type from the mapping done in UI will be prompted for Run Time Prompt RTP input. All required inputs are collected from the database, RTP, or member name and sent to the ML model as input data for prediction. The predicted values are saved back to the form/spreadsheet grid.

Generating Executable Rule/Script Embodiments

In one embodiment, the executable rule/script in block 230 of FIG. 2 may be generated to contain the following:

Input definition: Defining a data slice for necessary input features of the ML model. When input data for input features are present in data locations outside of a cube/spreadsheet of the target application, the rule/script uses commands to connect to the outside locations using REST APIs to connect with external systems such other databases or computing platforms (e.g., ERP, CRM, etc) to access and retrieve the input data from the outside locations.

Preprocessing of input: Any calculations (thresholds, arithmetic operations, etc.) to be performed on input features before sending the input data to ML models. This can be used for feature engineering as needed by the ML model.

ML model definition: Mapping the appropriate ML model i.e., PMML file that has been already imported into EPM Cloud.

Processing of output: Defining any post-processing steps to be applied to the ML model output based on the type of predictions being made. For example, in a sales opportunity prediction, this step may allow for prediction outputs (e.g., probability of lead conversion) to be transformed into estimated deal size or other form, which can be used for other calculations (e.g., revenue estimation).

Output definition: Defining the data slice where the output from the ML model should be inserted or pasted.

In another embodiment, the executable rules/script that is generated at block 230 of FIG. 2 may be configured as follows.

As previously stated, the rules/script functions as a data communication interface between the target application and the ML model. The rules/script is generated based on the mappings selected on the model mapping user interface 300. The rules/script (and thus the ML model) can be executed from a spreadsheet/form on-demand or run as a batch rule. The rule that runs on a spreadsheet/form assumes the input dimension members are defined on the form whereas the batch rule may take dimension members from a Run Time Prompt (RTP). The rule is configured to query a database as previously stated for the input values of the mapped members and call a prediction API with multiple sets of inputs. Respective output from the ML model prediction will be stored back to the database against the mapped members for output.

In one embodiment, an algorithm for generating the executable rule may include: getting the mapping information from model mapping UI; create an xml template for the rules; create variables for input from the Run Time Prompt; create variables for all the dimensions from the mappings except any cell value mapped dimensions for batch rule; generate the rules/script from the mapping information received from model mapping UI; load the rules/script to a rules processor or execution engine (e.g., a calculation manager); and deploy the rules/script to the target application.

In one embodiment, the rules/script may be generated to contain statements that perform an algorithm where the statements are based on at least the following functions:

Read the form/spreadsheet grid and get a point of view (POV), Row and Column dimensions and corresponding members. If any dimensions used in the Cell Value mapping are present in POV/Row, then move them to Column. Remove all other dimensions from Column. Replace the column members with those from the mappings. Compare all dimension members in the grid with those selected in the model mapping UI. Use only the common members from both. In the case that there are no common members, use the model mapping members. Create a map of cell intersections excluding mapped dimension members as the key and the corresponding database data as the data value. Add corresponding member from the intersection to the map as value, for input type 'Member' from model mapping UI 300. Add prompt values to the map. Pass the values to ML model prediction API. Obtain and store predicted values from the ML model against the corresponding intersection in a map. Form an output grid with the members from output model mapping and save the predicted data to the database of the target application.

Cloud or Enterprise Embodiments

In one embodiment, the integration method/system 100 is a computing/data processing system including an application or collection of distributed applications for enterprise organizations. The applications and computing system may be configured to operate with or be implemented as a cloud-based networking system, a software as a service (SaaS) architecture, or other type of networked computing solution. In one embodiment the integration system 100 is a centralized server-side application that provides at least the functions disclosed herein and that is accessed by many users via computing devices/terminals communicating with the computing system (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 5:
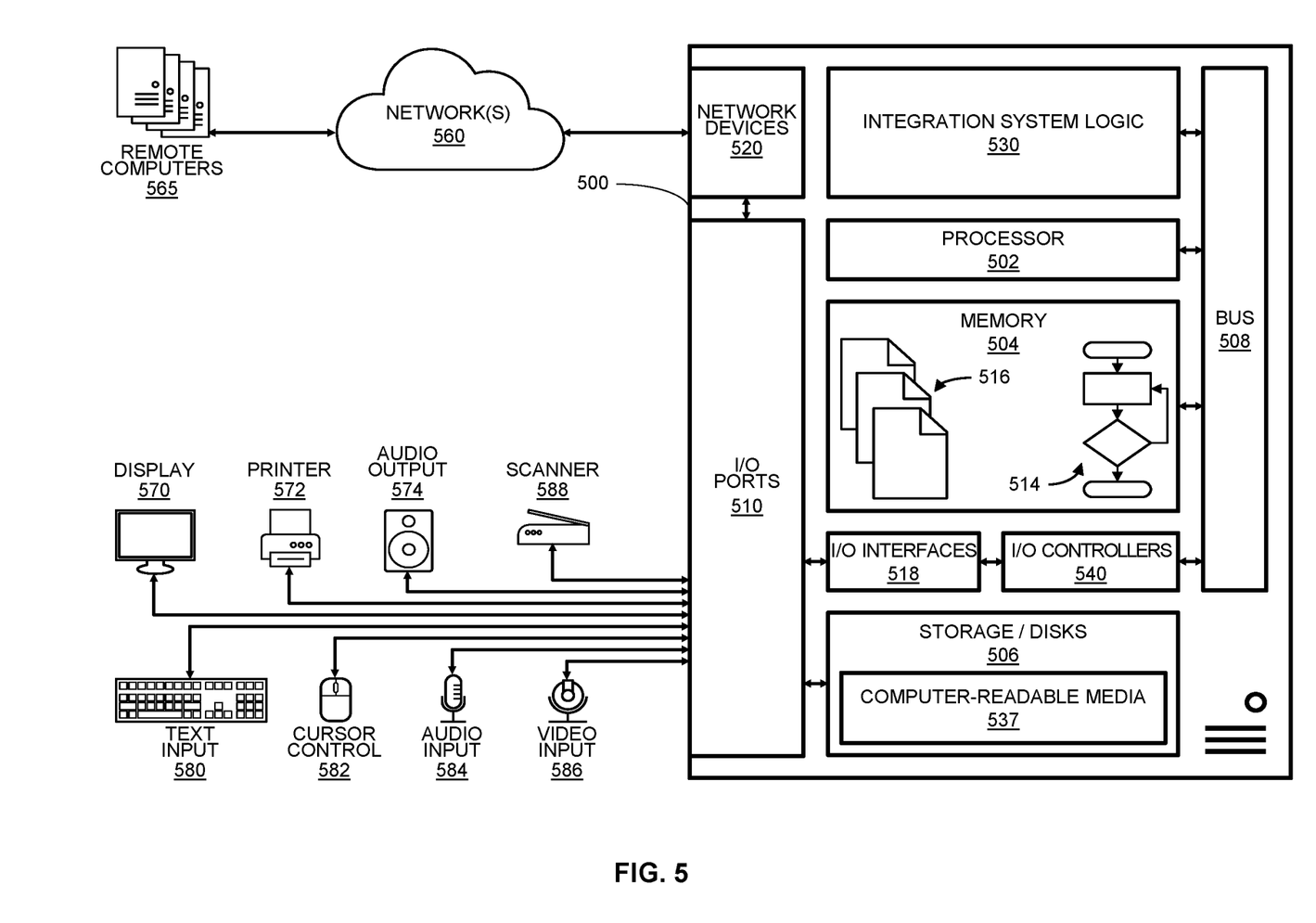
FIG. 5 illustrates an embodiment of a computing system configured with the example systems and/or methods disclosed.

FIG. 5 illustrates an example computing device that is configured and/or programmed as a special purpose computing device with one or more of the example systems and methods described herein, and/or equivalents. The example computing device may be a computer 500 that includes at least one hardware processor 502, a memory 504, and input/output ports 510 operably connected by a bus 508. In one example, the computer 500 may include integration system logic 530 configured to facilitate integrating ML models into a target application similar to system/methods 100 and 200 shown in FIGS. 1-4.

In different examples, the logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to integrate ML models into a target application similar to system/methods 100 and 200 shown in FIGS. 1-4. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing ML model integration.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:
at least one processor connected to at least one memory;
a non-transitory computer readable medium including instructions stored thereon that when executed by at least the processor cause the processor to:
generate a user interface configured to integrate a machine learning (ML) model into a target application, wherein the user interface provides a list of available ML models for selection on a display screen;
in response to a selected ML model from the list of available ML models, retrieve a definition file that represents the selected ML model;

parse the definition file to (1) identify one or more input features defined for the ML model, and (2) identify one or more output predictions that the ML model is configured to generate;

map the one or more input features of the ML model to one or more input data locations from the target application, wherein the one more input data locations provide input values to the one or more input features;

map the one or more output predictions of the ML model to one or more result locations within the target application;

generate an executable script configured as a data communication interface between the target application and the ML model and to execute the ML model based on the mappings;

wherein the executable script is configured to at least (i) retrieve input data values from the one or more input data locations from the target application and pass the data values to the ML model as the one or more input features, and (ii) obtain the one or more output predictions from the ML model and insert the one or more output predictions into the one or more result locations within the target application; and in response to receiving the one or more output predictions, based on the executable script, automatically insert the one or more output predictions in the one or more result locations within the target application.

2. The computing system of claim 1, wherein the definition file that represents the selected ML model is a predictive model markup language (PMML) file or an open neural network exchange (ONNX) file format.

3. The computing system of claim 1, wherein the machine learning (ML) model is designated to integrate into the target application on-demand;

wherein the target application is a multi-dimensional application that when executed on-demand generates one or more data sheets with rows and columns of data values, wherein each intersection of the rows and the columns identifies a cell location within a data sheet;

wherein the executable script is configured to retrieve the input data values from the one or more input data locations that are cell locations within the one or more data sheets; and wherein the executable script maps the input data values from the cell locations to the one or more input features of the ML model.

4. The computing system of claim 1, wherein the machine learning (ML) model is integrated into the target application on-demand; and wherein the executable script is a groovy rule configured to retrieve the input data values from the one or more input data locations that correspond to one or more cell locations in one or more data forms displayed by the target application during execution of the target application.

5. The computing system of claim 1, wherein the executable script is configured to execute on-demand; and wherein based on the mappings, the computing system is configured to generate a second executable script that is configured to execute as a batch process;

wherein the second executable script is configured to retrieve the input data values from the one or more input data locations by querying a database associated with the target application and retrieving the input data values corresponding to the one or more input data locations from the database.

6. The computing system of claim 1, wherein the target application is a multi-dimensional planning application; and wherein the ML model is configured to generate predictions based on data values from the multi-dimensional planning application that are mapped to the one or more input features of the ML model.

7. The computing system of claim 1, wherein executable script is configured to function as a data controller and data communication interface to obtain data from selected data locations and pass data between the target application and the ML model.

8. A computer-implemented method performed by a computing device including at least one processor, the method comprising:

generating, on a display device, a user interface configured to integrate a machine learning (ML) model into a target application, wherein the user interface provides a list of available ML models for selection on the display device;

in response to a selected ML model being selected from the list of available ML models, retrieving a definition file that represents the selected ML model;

parsing the definition file to (i) identify one or more input features defined for the ML model, and (ii) identify one or more output predictions that the ML model is configured to generate;

mapping, via the user interface, the one or more input features of the ML model to one or more input data locations from the target application, wherein the one more input data locations provide input values to the one or more input features;

mapping, via the user interface, the one or more output predictions of the ML model to one or more result locations associated with the target application;

generating and executing, by at least the computing device, an executable rule including executable code that at least (i) defines the mappings between the ML model and the target application, and (ii) transmits data values from the one or more input data locations to the ML model as input;

executing, by at least the computing device, the ML model based on the input to generate the one or more output predictions; and inserting the one or more output predictions into the one or more result locations associated with the target application.

9. The method of claim 8, wherein generating the executable rule further includes:

configuring the executable rule based on the mappings, wherein the executable rule is configured to include executable code that causes the computing device to perform functions comprising:

(i) retrieving input data values from the one or more input data locations from the target application;

(ii) transmitting the data values to the ML model as the one or more input features;

(iii) obtaining the one or more output predictions from the ML model; and (iv) inserting the one or more output predictions into the one or more result locations within the target application.

10. The method of claim 8, wherein the definition file that represents the selected ML model is a predictive model markup language (PMML) file or an open neural network exchange (ONNX) file format.

11. The method of claim 8, wherein the user interface provides options for executing the machine learning (ML) model on-demand or as a batch process;
   wherein the target application is a multi-dimensional application that when executed on-demand generates one or more data sheets with rows and columns of data values, wherein each intersection of the rows and the columns identifies a cell location within a data sheet;
   in response to the on-demand option:
   configuring the executable rule to retrieve the input data values from the one or more input data locations that are cell locations within the one or more data sheets; and
   configuring the executable rule to transmit the input data values from the cell locations to the one or more input features of the ML model.

12. The method of claim 8, wherein the user interface provides an option for executing the machine learning (ML) model on-demand or as a batch process;
   in response to the on-demand option:
   integrating the machine learning (ML) model into the target application on-demand while the target application is executing; and
   configuring the executable rule to retrieve the input data values from the one or more input data locations that correspond to one or more cell locations in one or more data forms displayed by the target application during execution of the target application.

13. The method of claim 8, wherein the user interface provides an option for executing the machine learning (ML) model on-demand or as a batch process;
   in response to a selection of the batch process:
   configuring the executable rule to retrieve the input data values from the one or more input data locations by querying a database associated with the target application and retrieving the input data values corresponding to the one or more input data locations from the database; and
   wherein the executable rule and the ML model are executed while the target application is not executing.

14. A non-transitory computer readable medium including instructions stored thereon that when executed by at least the processor cause the processor to:
   generate a user interface configured to integrate a machine learning (ML) model into a target application;
   parse a definition file that represents a selected ML model to identify one or more input features defined for the ML model, and identify one or more output predictions that the ML model is configured to generate;
   map the one or more input features of the ML model to one or more input data locations from the target application, wherein the one more input data locations provide input values to the one or more input features;
   map the one or more output predictions of the ML model to one or more result locations within the target application;
   generate executable script configured to function as a data controller and data communication interface to obtain the input values from the one or more input data locations and pass data between the target application and the ML model;
   wherein the executable script is configured to execute the ML model with the input values and obtain the one or more output predictions from the ML model; and
   in response to obtaining the one or more output predictions, based on the executable script, insert the one or more output predictions in the one or more result locations within the target application.

15. The non-transitory computer readable medium of claim 14,
   wherein the executable script is configured to at least (i) retrieve input data values from the one or more input data locations from the target application and pass the data values to the ML model as the one or more input features, and (ii) obtain the one or more output predictions from the ML model and automatically insert the one or more output predictions into the one or more result locations within the target application.

16. The non-transitory computer readable medium of claim 14, wherein the definition file that represents the selected ML model is a predictive model markup language (PMML) file or an open neural network exchange (ONNX) file format.

17. The non-transitory computer readable medium of claim 14, wherein the machine learning (ML) model is designated to integrate into the target application on-demand;
   wherein the target application is a multi-dimensional application that when executed on-demand generates one or more data sheets with rows and columns of data values, wherein each intersection of the rows and the columns identifies a cell location within a data sheet;
   wherein the executable script is configured to retrieve the input data values from the one or more input data locations that are cell locations within the one or more data sheets; and
   wherein the executable script maps the input data values from the cell locations to the one or more input features of the ML model.

18. The non-transitory computer readable medium of claim 14, wherein the machine learning (ML) model is integrated into the target application on-demand; and
   wherein the executable script is a groovy rule configured to retrieve the input data values from the one or more input data locations that correspond to one or more cell locations in one or more data forms displayed by the target application during execution of the target application.

19. The non-transitory computer readable medium of claim 14, wherein the executable script is configured to execute on-demand; and
   wherein based on the mappings, a second executable script is generated that is configured to execute as a batch process;
   wherein the second executable script is configured to retrieve the input data values from the one or more input data locations by querying a database associated with the target application and retrieving the input data values corresponding to the one or more input data locations from the database.

20. The non-transitory computer readable medium of claim 14, wherein the target application is a multi-dimensional planning application; and
   wherein the ML model is configured to generate predictions based on data values from the multi-dimensional planning application that are mapped to the one or more input features of the ML model.

* * * * *